(12) United States Patent
Inomoto et al.

(10) Patent No.: US 8,144,237 B2
(45) Date of Patent: Mar. 27, 2012

(54) IMAGE PICKUP OPTICAL SYSTEM AND IMAGE PICKUP APPARATUS

(75) Inventors: Yu Inomoto, Tokyo (JP); Ryuji Ohmuro, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 248 days.

(21) Appl. No.: 12/694,326

(22) Filed: Jan. 27, 2010

(65) Prior Publication Data

US 2010/0194968 A1 Aug. 5, 2010

(30) Foreign Application Priority Data

Jan. 30, 2009 (JP) .................................. 2009-020245

(51) Int. Cl.
*H40N 5/232* (2006.01)
*H04N 9/07* (2006.01)
*H04N 5/225* (2006.01)
*G02B 7/28* (2006.01)

(52) U.S. Cl. ........ 348/345; 348/337; 348/338; 348/343; 348/353

(58) Field of Classification Search .............. 348/345, 348/337, 338, 343, 353; 396/111, 112, 113
See application file for complete search history.

(56) References Cited

U.S. PATENT DOCUMENTS

| | | | | |
|---|---|---|---|---|
| 4,778,984 A | * | 10/1988 | Nakamura | 250/201.4 |
| 2003/0174232 A1 | | 9/2003 | Yahagi et al. | |
| 2004/0036794 A1 | | 2/2004 | Kanayama et al. | |
| 2005/0147403 A1 | * | 7/2005 | Ohmura | 396/114 |
| 2007/0126920 A1 | * | 6/2007 | Lee | 348/345 |
| 2008/0088942 A1 | * | 4/2008 | Seo | 359/672 |

FOREIGN PATENT DOCUMENTS

| | | |
|---|---|---|
| JP | 1-234809 A | 9/1989 |
| JP | 2003-270517 A | 9/2003 |
| JP | 2004-085676 A | 3/2004 |

\* cited by examiner

*Primary Examiner* — David Ometz
*Assistant Examiner* — Quang Le
(74) *Attorney, Agent, or Firm* — Rossi, Kimms & McDowell LLP

(57) ABSTRACT

An image pickup optical system including: a first prism including: a first incident surface where subject beam enters; a division surface for dividing the beam from the first incident surface into image-pickup beam and focus-detection beam; and a first exit surface from which reflection beam reflected on the division surface, the image-pickup beam or the focus-detection beam, exits; and a second prism including: a second incident surface on which transmission beam passing through the division surface, the image-pickup beam or focus-detection beam, enters; and a second exit surface from which the transmission beam exits, wherein the reflection beam is reflected on the division surface, reflected on the first incident surface, and reflected on the division surface to reach the first exit surface, and satisfying $0.1 < D_A/D_B < 0.5$, where $D_A$ and $D_B$ indicate beam diameters of beams toward the image pickup elements for focus detection and for image pickup.

7 Claims, 12 Drawing Sheets

IMAGE PICKUP OPTICAL SYSTEM AND IMAGE PICKUP APPARATUS

BACKGROUND OF THE INVENTION

1. Field of the Invention

The present invention relates to an image pickup optical system and an image pickup apparatus for separating a part of a light beam traveling from a subject.

2. Description of the Related Art

One of passive autofocus systems of a camera or video camera is a pupil division method for phase detection autofocus. The pupil division method is a method of obtaining a focus signal. In this method, a part of a light beam from a subject is separated from the light beam by a light beam division element and made incident on an image pickup element for focus detection (U.S. Patent Application Publication No. 2003/0174232 and U.S. Patent Application Publication No. 2004/0036794).

Such method has a feature that a focus position may be searched without an influence on a pickup image, because a lens provided on an optical path of a separated light beam is not driven to search the focus position (detect focus position).

SUMMARY OF THE INVENTION

The present invention provides an image pickup optical system including; a first prism including; a first incident surface on which a subject light beam from a subject is incident, a division surface for dividing the subject light beam, which entered through the first incident surface, into an light beam for image pickup traveling toward an image pickup element and a light beam for focus detection traveling toward an image pickup element for focus detection, and a first exit surface from which a reflection light beam is emerged, the reflection light beam being one of the image pickup light beam and the light beam for focus detection which is reflected on the division surface, and a second prism including; a second incident surface on which a transmission light beam is incident, the transmission light beam being another one of the image pickup light beam and the light beam for focus detection which passes through the division surface, and a second exit surface from which the transmission light beam is emerged, in which the reflection light beam is reflected on the division surface for a first time and then reflected on the first incident surface, and reflected on the division surface for a second time to reach the first exit surface, and in which the image pickup optical system satisfies the following conditional expression $$0.1 < D_A/D_B < 0.5$$

where $D_A$ indicates an effective light beam diameter of a light beam guided to the image pickup element for focus detection, and $D_B$ indicates an effective light beam diameter of a light beam guided to the image pickup element for image pickup.

Further features of the present invention become apparent from the following description of exemplary embodiments with reference to the attached drawings.

Figure 11:
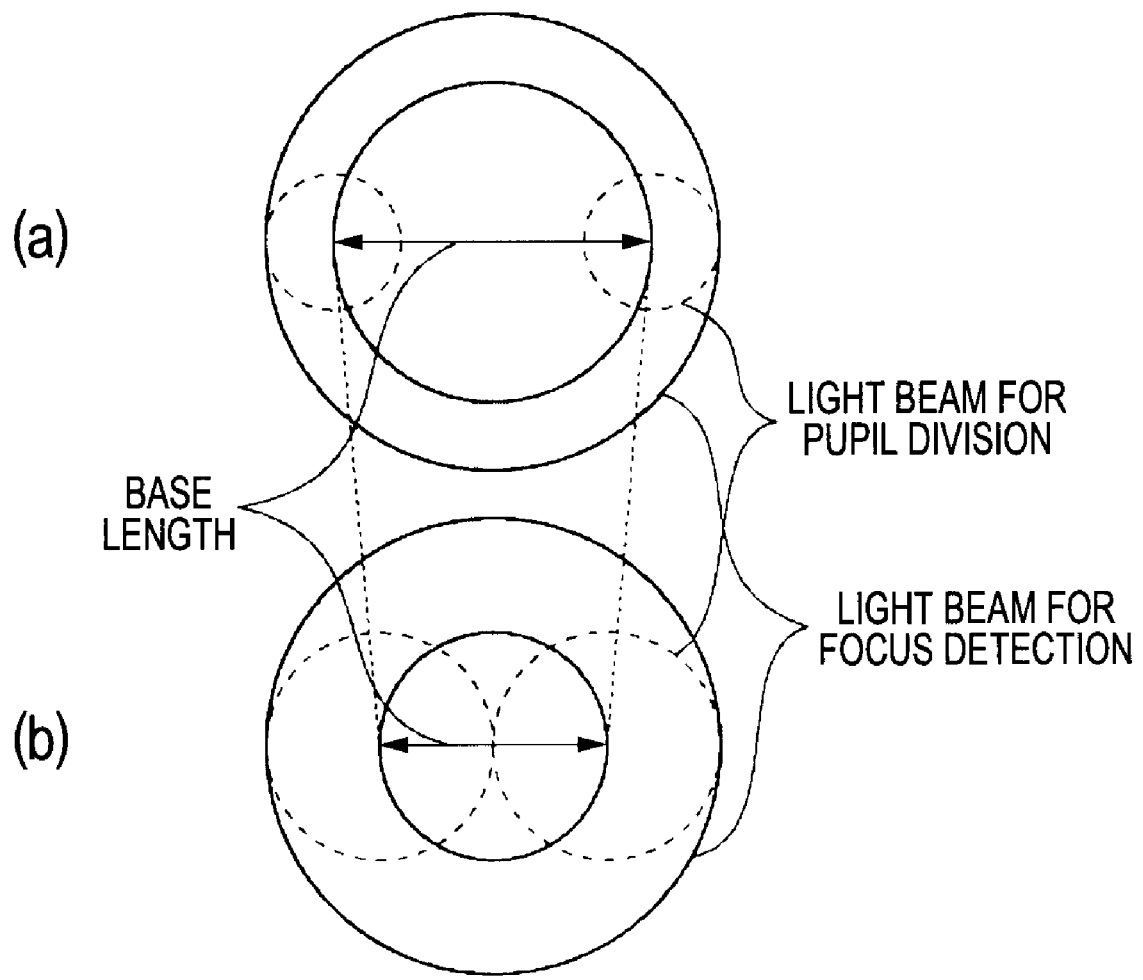

(a) and (b) of FIG. 11 are schematic views each illustrating a light beam for focus detection.

Figure 12:
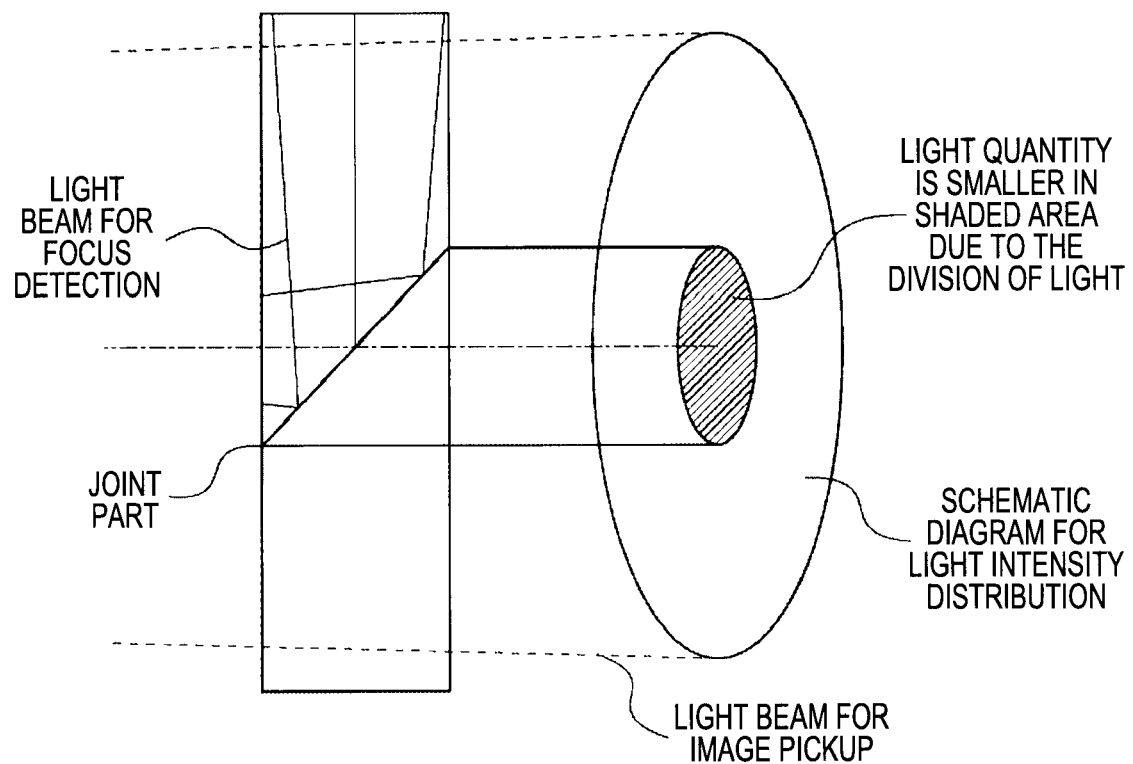

FIG. 12 is a cross sectional view illustrating a light beam division optical system according to a comparative example.

DESCRIPTION OF THE EMBODIMENTS

Hereinafter, embodiments of the present invention are described with reference to the attached drawings. Assume that a light beam from a subject is a subject light beam, a light beam for image pickup which is divided by a light beam division optical system to travel to an image pickup element is an image pickup light beam, and a light beam which is divided by the light beam division optical system to travel to an image pickup element for focus detection is a light beam for focus detection.

Figure 1:
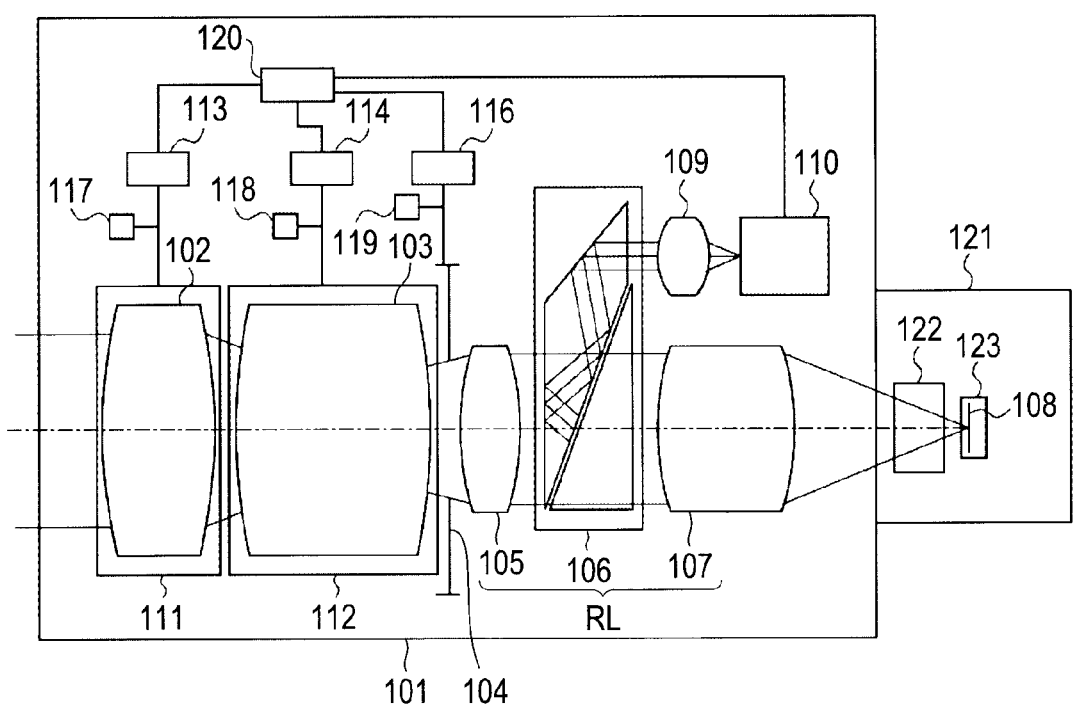
FIG. 1 is a schematic diagram illustrating a principal part of a zoom lens according to the present invention.

FIG. 1 is a schematic diagram illustrating a principal part of a zoom lens (image pickup optical system) according to the present invention and a camera (image pickup apparatus) which includes the zoom lens and a camera main body (image pickup apparatus main body). In FIG. 1, a zoom lens 101 includes a focusing section 102, a magnification-varying section 103 having a zoom function, a stop 104 for light quantity adjustment, relay lens units 105 to 107 (hereinafter, collectively referred to as imaging section RL), and a light beam division prism (light beam division optical system) 106. The zoom lens 101 is detachably attached to the camera main body (image pickup apparatus main body) 121. The zoom lens 101 further includes a lens unit 109 for focus detection (hereinafter, referred to as focus detection lens unit 109), a focus detection element (image pickup element for focus detection) 110, drive mechanisms 111 and 112, motors 113, 114, and 116, and detectors 117 to 119. The camera main body 121 includes a glass block 122, a charge coupled device (CCD) (image pickup element for image pickup) 123, an optical filter or color separation prism (not shown) for separating the image pickup light beam into each color. An imaging plane 108 is a plane on which the image pickup light beam is imaged. For focusing, the motors 113, 114, and 116 drive the drive mechanisms 111 and 112 and the stop 104 to make the position of the imaging plane 108 and an image pickup surface of the CCD 123 coincident each other. Examples of the image pickup elements may include, in addition to the CCD, a CMOS sensor, an image pickup tube, a micro-channel plate (MCP), and a high-gain avalanche rushing amorphous photoconductor (HARP) tube. When such an image pickup element is used, a moving picture may be obtained.

In the embodiments, the magnification-variable zoom lens is described as an example of the image pickup optical system. However, the present invention is not limited to the embodiments. An image pickup optical system which has no magnification-varying section (zoom function) but an autofocus function may be provided.

The focusing section 102 is a lens unit moved for focusing. Whole or a part of the focusing section 102 may be moved during focusing.

The magnification-varying section 103 is a lens unit moved for magnification varying (zooming). The magnification-varying section 103 includes a variator which moves during magnification varying and a compensator for correcting a fluctuation in paraxial image due to the magnification varying.

The imaging section RL includes, in order from a subject side to an image pickup element side (image plane side), the front lens unit 105, the light beam division prism (light beam division optical system) 106, and the rear lens unit 107, which are provided. The rear lens unit 107 may be moved during focusing.

In FIG. 1, the light beam division prism 106 is provided at the rear (on image pickup element side or image pickup surface side) of the stop 104. However, when the stop 104 is stopped down by a value equal to or larger than a predetermined value (aperture diameter of stop is reduced by value equal to or larger than certain value), the amount of light beam reaching the focus detection element 110 is small, and hence focus detection cannot be performed or it is likely to reduce focus detection precision. Therefore, the light beam division prism 106 may be provided at the front (on the subject side) of the stop 104.

The focus detection lens unit 109 guides, to the focus detection element, a divisional light beam for focus detection obtained by the light beam division prism 106.

The focus detection element 110 receives (detects) the light beam for focus detection guided to the focus detection element by the focus detection lens unit 109 and outputs a focus detection signal. The focusing section 102 is driven by the motor 113 based on the focus detection signal, to thereby perform focusing.

The drive mechanisms 111 and 112 are, for example, helicoids or cams for driving the lens units 102 and 103 in an optical axis direction.

The motors 113, 114, and 116 are used to electrically drive the drive mechanisms 111 and 112 and the stop 104. The drive mechanisms 111 and 112 and the stop 104 are electrically driven by the respective motors 113, 114, and 116 but may be also manually driven by an operator in addition to the electrical driving.

The detectors 117 to 119 detect the positions of the lens units 102 and 103 on the optical axis and the aperture diameter of the stop 104 for light quantity adjustment, and each are, for example, an encoder, a potentiometer, or a photo sensor.

A focus position calculation section 120 calculates a suitable position of the focusing section 102.

Next, an autofocus process in the embodiments is described. The divisional light beam for focus detection obtained by the light beam division prism 106 is guided to the focus detection element 110 by the focus detection lens unit 109. Then, the focus position calculation section 120 calculates the suitable position of the focusing section 102 based on the focus detection signal detected from the focus detection element 110. The focusing section 102 is moved to the calculated position by the motor 113, to thereby perform focusing. Note that the focus position calculation section 120 may calculate the suitable position (focus position) of the focusing section 102 based on position information of the focusing section 102, the magnification-varying section 103, and the stop 104 which are obtained by the detectors 117 to 119 if necessary.

Figure 2:
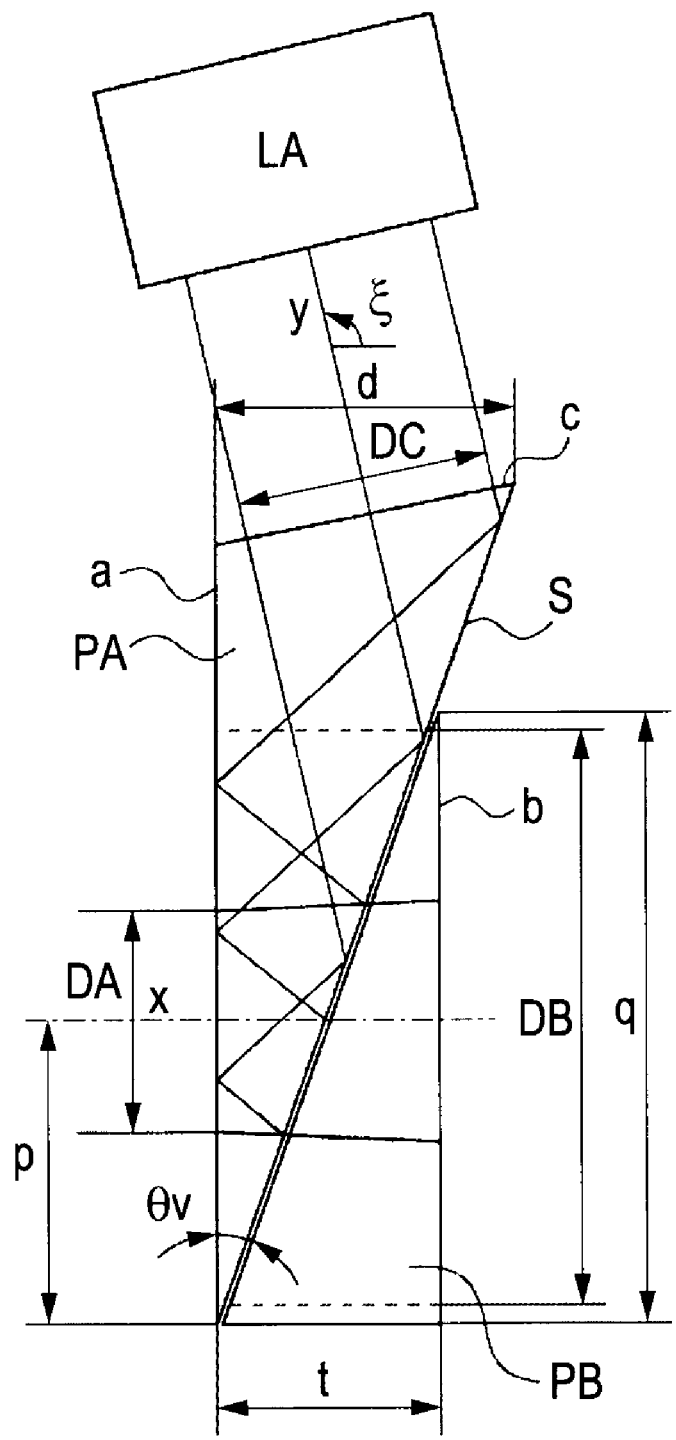
FIG. 2 is a schematic diagram illustrating a light beam division optical system according to the present invention.
Figure 3:
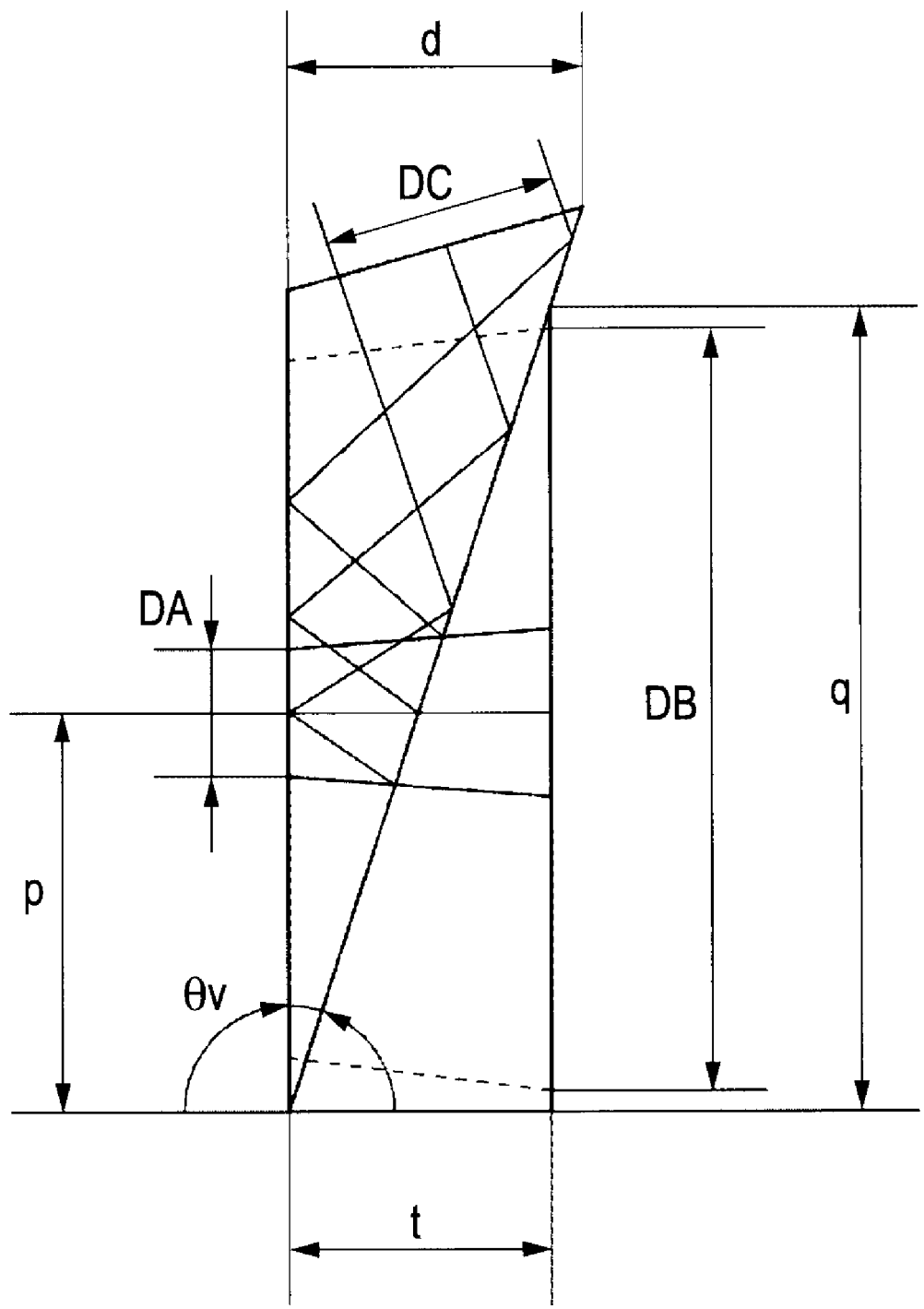
FIG. 3 is a cross sectional diagram illustrating a light beam division optical system according to Embodiment 1 of the present invention.
Figure 4:
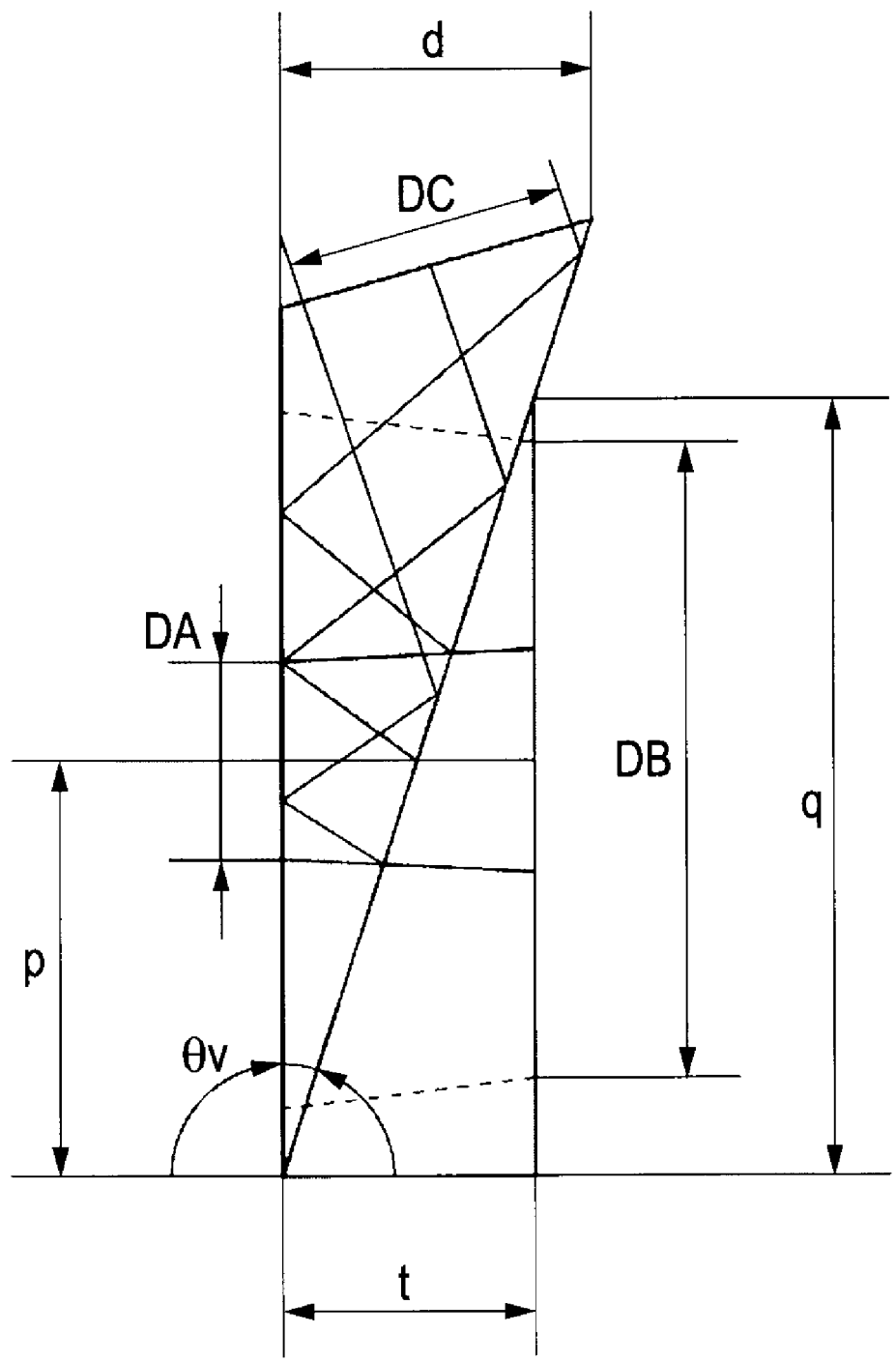
FIG. 4 is a cross sectional diagram illustrating a light beam division optical system according to Embodiment 2 of the present invention.
Figure 5:
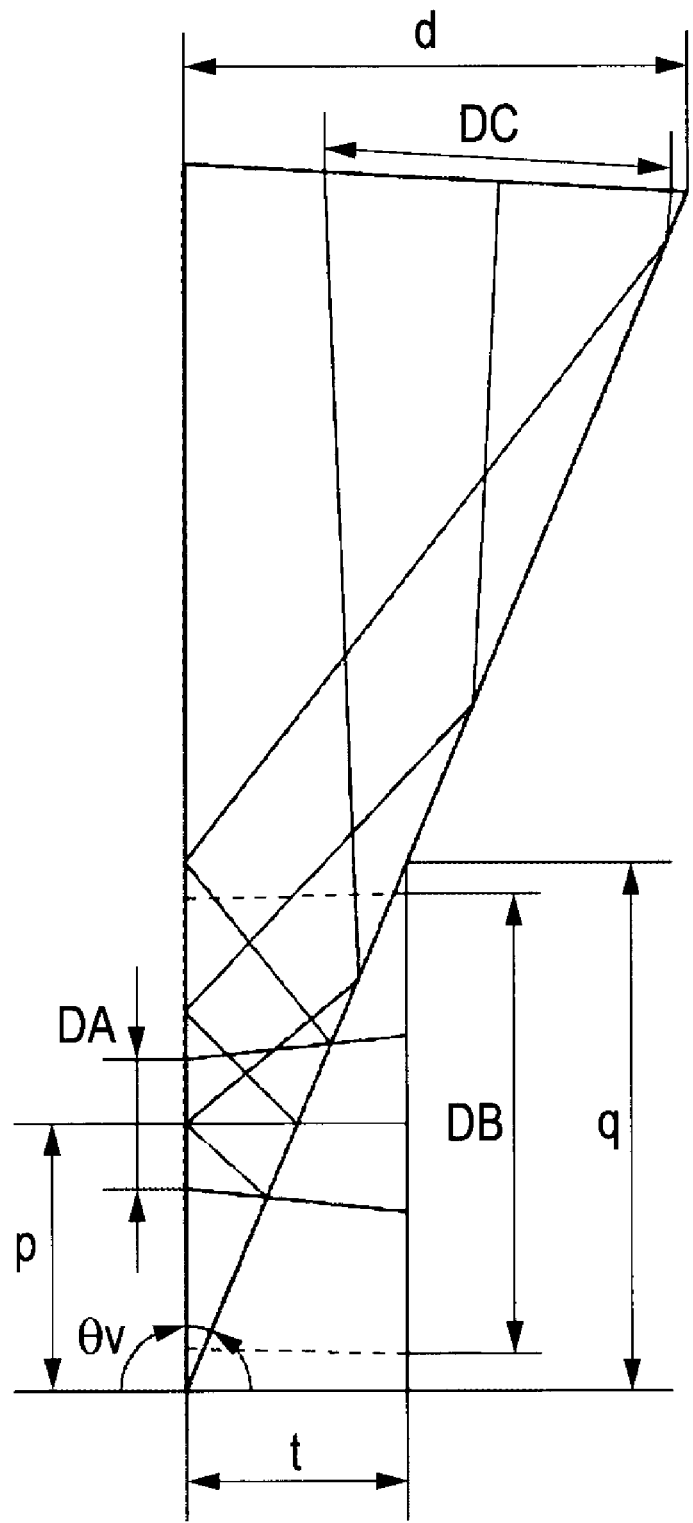
FIG. 5 is a cross sectional diagram illustrating a light beam division optical system according to Embodiment 3 of the present invention.
Figure 6:
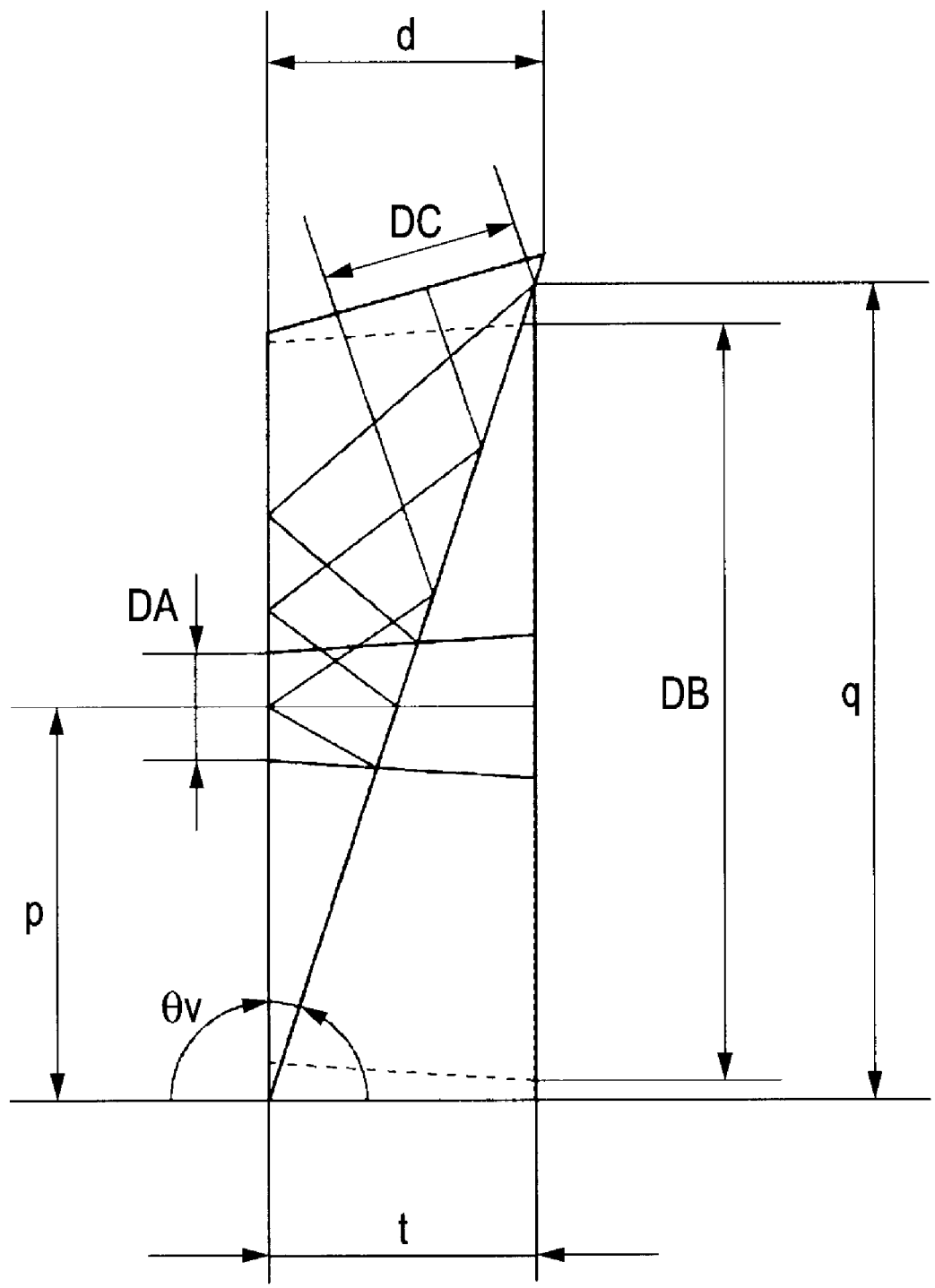
FIG. 6 is a cross sectional diagram illustrating a light beam division optical system according to Embodiment 4 of the present invention.

Next, the light beam division prism 106 is described with reference to FIG. 2. FIG. 2 is a schematic diagram illustrating a light beam division optical system according to the embodiments of the present invention. In FIG. 2, an optical axis of the zoom lens is represented by reference symbol "x", an optical axis of a divisional light beam traveling to a focus detection section LA is represented by reference symbol "y", and a half mirror surface for light beam division is represented by reference symbol "S". The focus detection section LA corresponds to the focus detection lens unit 109 and the focus detection element 110 described above. The light beam division prism is provided such that an incident surface "a" and an exit surface "b" are perpendicular to the optical axis "x". An air gap (air interval) is formed between a prism $P_A$ (first prism) and a prism $P_B$ (second prism). The prism $P_A$ has the incident surface (first incident surface) "a" on which the subject light beam is incident, a half mirror surface (division surface), and a first exit surface "c" from which a light beam (reflected light beam or light beam for focus detection) reflected on the half mirror surface is emitted from the prism $P_A$ toward the focus detection element. The prism $P_B$ has a second incident surface which is provided along the half mirror surface with the air gap between the half mirror surface and the second incident surface and receives a light beam (transmission light beam or image pickup light beam) passing through the half mirror surface, and a second exit surface from which the light beam entering the second incident surface is emitted.

When the light beam division prism (light beam division optical system) as described above is used, a thickness of the zoom lens in the optical axis direction can be reduced, and hence the zoom lens may be configured compact in size.

The incident surface "a" and the exit surface "b" are parallel to each other. An interval between the incident surface "a" and the exit surface "b" in the optical axis "x" direction is expressed by "t". A thickness of the prism $P_A$ in the optical axis "x" direction is expressed by "d". An effective diameter on the incident surface "a" of the prism $P_A$, of a light beam necessary for the light beam for focus detection guided to the focus detection section LA is represented by reference symbol $D_A$. An effective diameter on the exit surface "b" of the prism $P_B$, of a light beam for image pickup (hereinafter, referred to as image pickup light beam) which is guided to the image pickup element 123 is represented by reference symbol $D_B$. An effective diameter on the exit surface "c" of the prism $P_A$, of a light beam for the light beam for focus detection guided to the focus detection section LA is represented by reference symbol $D_C$. An angle formed between the reflective surface (half mirror surface) S and the incident surface "a" (apex angle of prism $P_A$) is represented by $\theta_y$. A length of the exit surface "b" in a direction perpendicular to the optical axis "x" is represented by reference symbol "q" and is larger than $D_B$. A length of the incident surface "a" between the optical axis "x" and the half mirror surface S in the direction perpendicular to the optical axis "x" is represented by reference symbol "p". Reference symbol ξ represents an angle between the direction of a principal ray of a light beam emerged from the divisional exit surface "c" and the direction of the optical axis "x". In other wards, the reference symbol ξ represents an angle between a vector which is parallel to an optical axis y of a light bean emerged from the exit surface "c" and has a direction toward the focus detection section LA and a vector which is parallel to the optical axis x and has a direction from the subject side toward the image pickup element, wherein the angle ξ is smaller than 180 degrees. The divisional exit surface "c" is provided perpendicular to the optical axis "y". Note that each of $D_A$ and $D_B$ may be indicated as a light beam width in the cross section of FIG. 1, that is, a light beam width in a plane including both the optical axis of the zoom lens (image pickup optical system) and the normal to the half mirror surface (light beam division surface).

The half mirror surface S is coated with, for example, a metal film or a multilayer film for light beam division to divide the incident light beam (subject light beam) into the transmission light (image pickup light beam) and the reflected light (light beam for focus detection) at a predetermined ratio. The half mirror surface S is disposed to divide the light beam over the entire region through which the light beam from the subject (effective light beam) passes. In other words, of light beams from the subject, all light beams passing through the focusing section 102 and the magnification-varying section 103 reach, through the half mirror surface S, the image pickup element 123 or the focus detection element 110 which are provided in subsequent stages.

A light beam indicated by broken lines is a light beam for determining the effective diameter $D_B$ of the image pickup light beam. A light beam indicated by solid lines is a light beam for determining the effective diameters $D_A$ and $D_C$ of the light beam guided to the focus detection section LA.

The light beam reflected on the half mirror surface S at a predetermined reflectance is totally reflected on the incident surface "a", and then totally reflected on the half mirror surface S again and emerged from the divisional exit surface "c". In view of the total reflection conditions, the apex angle $\theta_v$ of the prism $P_A$ satisfies the following conditional expressions.

$$\theta_v < \sin^{-1}\left(\frac{1}{n}\right) - |\alpha| \quad (1)$$

$$\theta_v > \frac{1}{2}\left\{\sin^{-1}\left(\frac{1}{n}\right) + |\bar{\alpha}|\right\} \quad (2)$$

$$\theta_v < \frac{1}{3}\left(\frac{\pi}{2} - |\bar{\alpha}|\right) \quad (3)$$

Note that n indicates a refractive index of the prisms $P_A$ and $P_B$ and α indicates a maximum angle among angles with respect to the optical axis "x", of all light beams incident on the prism $P_A$. $\bar{\alpha}$ indicates a maximum angle among angles with respect to the optical axis "x", of light beams guided to the focus detection section LA. The angles α and $\bar{\alpha}$ are angles formed by light beams after the incidence on the prism and correspond to any one of angles of an axial marginal light beam and an off-axis marginal light beam.

Conditional expression (1) defines a condition in which first reflection on the half mirror surface S is not the total reflection and determines an upper limit of the apex angle $\theta_v$ of the prism. Conditional expression (2) defines a condition in which second total reflection occurs on the incident surface "a" and determines a lower limit of the apex angle $\theta_v$. Conditional expression (3) defines a condition in which third total reflection occurs on the half mirror surface S and determines an upper limit of the apex angle $\theta_v$. Although the conditional expressions (1) and (3) determine the upper limits of the apex angle $\theta_v$, depending on a combination of $n, \alpha, \bar{\alpha}$ one of the conditional expressions (1) and (3) shows a more tight condition.

The apex angle $\theta_v$ desirably satisfies $16.0° \leq \theta_v \leq 28.0°$.

In the embodiments of the present invention, Conditional Expression (4) described below is satisfied.

$$0.1 < \frac{D_A}{D_B} < 0.5 \quad (4)$$

The light beam passing through the light beam division prism 106 is substantially afocal (light beam converged at one point on an image plane is substantially parallel light beam). In this case, the effective light beam diameter $D_A$ ($D_B$) may be defined by "$D_A = f_A/F_A$ ($D_B = f_B/F_B$)". Note that $f_A$ and $f_B$ indicate a focal length of the focus detection lens unit 109 and a focal length of the relay lens unit 107, respectively, and $F_A$ and $F_B$ indicate an open F value of the entire lens system (optical system) for guiding the subject light beam to the focus detection element 110 and an open F value of the entire lens system for guiding the subject light beam to the image pickup element 123, respectively. A distance between a rear principal point position of the focus detection lens unit 109 and an imaging point (image pickup element for focus detection) is defined by $d_{AF}$. A distance between a rear principal point position of the relay lens unit 107 and an imaging point (image pickup element for image pickup) is defined by $d_{IM}$. When such definitions are used, "substantially afocal" described above may be expressed by numerical ranges:

$0.7 < f_A/d_{AF} < 1.3 (0.7 < f_A/d_{AF} < 1.1)$; and $0.7 < f_B/d_{IM} < 1.3 (0.7 < f_B/d_{IM} < 1.1)$.

In the embodiments, the entire lens system for guiding the subject light beam to the focus detection element 110 includes the focusing lens unit 102, the magnification-varying lens unit 103, the front lens unit 105, the light beam division prism 106, and the focus detection lens unit 109. The entire lens system for guiding the subject light beam to the image pickup element includes the focusing lens unit 102, the magnification-varying lens unit 103, the front lens unit 105, the light beam division prism 106, the rear lens unit 107, and the glass block 122.

Unlike a contrast system, a phase-differential system allows focus position detection based on only a part of an effective image pickup light beam. Conditional Expression (4) defines a condition associated with focus detection precision (focus detection light beam amount), sharpness of a pickup image, and brightness (image pickup light beam amount).

A case where $D_A/D_B$ falls below a lower limit of Conditional Expression (4) is described. In the phase-differential system, a phase difference signal of two pupil-divided light beams ((a) and (b) of FIG. 11) is detected. When a base length between the light beams is lengthened, a resolution of detection against focus deviation is improved. When the amount of divided light beams for detection increase, focus detection may be performed in a short period of time. Therefore, in order to improve the autofocus performance, it is important to lengthen the base length between the pupil-divided light beams to increase the amount of divided light beams for detection.

However, in a case of a predetermined light beam diameter (or pupil diameter), when the base length is to be lengthened, it is difficult to increase the amount of divided light beams for detection. Hereinafter, such incompatibility is described with reference to (a) and (b) of FIG. 11. (a) and (b) of FIG. 11 are schematic views illustrating a minimum light beam diameter used for phase difference detection (hereinafter, light beams are referred to as light beams for focus detection for the sake of convenience). The divided light beams for focus detection have the same light beam diameter. As illustrated in (a) of FIG. 11, when the light beams for pupil division are reduced in diameter while the light beams for pupil division is inscribed in the light beams for focus detection, the base length may be lengthened but the amount of light beams are reduced. On the other hand, as illustrated in (b) of FIG. 11, when the light beams for pupil division have a large size, the amount of light beams are increased but the base length is shortened.

As described above, there is the trade off relationship between the lengthening of the base length and the increase in amount of light beams. In order to satisfy both a resolution and a detection time period which are required for an image pickup system, it is necessary to ensure a minimum limit of the effective light beam diameter $D_A$ of the light beam guided to the detection section. When the effective light beam diameter $D_A$ is very smaller than the effective light beam diameter $D_B$ and thus $D_A/D_B$ falls below the lower limit of Conditional Expression (4), the minimum limit of the effective light beam diameter of the light beam guided to the focus detection section LA cannot be ensured, and hence it is difficult to detect a focusing position in a short time period with high precision. The lower limit value of Conditional Expression (4) is more desirably set to 0.12.

Next, a case where $D_A/D_B$ exceeds an upper limit of Conditional Expression (4) is described. When the light beam for focus detection are incident as a diverged light beam or when the off-axial marginal light beam is incident at an angle in which a distance between the off-axial marginal light beam and the optical axis increases, the exit light beam diameter $D_C$ becomes larger with respect to the incident light beam diameter $D_A$. Therefore, in order to reduce the size of the prism $P_A$, it is necessary to make the apex angle $\theta_v$ close to a lower limit of conditional Expression (2). When the effective light beam diameter $D_A$ is set to exceed the upper limit of Conditional Expression (4) while the apex angle $\theta_v$ is held to a value close to the lower limit, it is more likely to eclipse a lower light beam on the exit surface "c". When the apex angle $\theta_v$ is set to a large value, the lower light beam is not eclipsed. In contrast to this, an upper light beam is eclipsed. In any case, it is necessary to increase the thickness "d" of the prism $P_A$. Therefore, when $D_A/D_B$ exceeds an upper limit of Conditional Expression (4), it is difficult to reduce the size and weight of the lens unit 109 after the light beam division.

When the focus position is to be detected by the phase difference system, the diameter of the focus detection light beam is minimized. Therefore, when the focus detection light beam is blocked by the stop, the focus position cannot be detected. It may be said that the diameter of the focus detection light beam determines a maximum F value capable of detecting the focus position. In other words, when the F value is large, the light beam is not likely to be blocked by the stop, and hence a stable autofocus operation may be performed. In particular, in a case of a moving picture taking system, the F value is desirably set to a large value to reduce the influence of the stop, to thereby perform the stable autofocus operation. The upper limit value of the Conditional Expression (4) is set to desirably 0.43 (more desirably 0.36).

As is apparent from the description, when the focus position is to be detected by the phase difference system, it is desirable to set the F value of the focus detection light beam to a value approximately two to ten times larger than the F value in the image pickup system in view of the focusing precision, the detection time period, and the stable autofocus operation.

When the structure as described above is employed, the thickness of the zoom lens in the optical axis direction may be reduced, and hence the image pickup optical system or an image pickup apparatus is easily reduced in size and weight. In addition to this, the width of the light beam which is obtained by division for focus detection and then guided to the optical system may be sufficiently ensured, and hence the focus position is easily detected.

Table 1 illustrates parameters of a light beam division prism (light beam division optical system) corresponding to a structure in each of Embodiments 1 to 4. FIGS. 3 to 6 are cross sectional diagrams illustrating the respective embodiments.

TABLE 1

|  | Embodiment | | | |
| --- | --- | --- | --- | --- |
|  | 1 | 2 | 3 | 4 |
| n | 1.83481 | 1.83481 | 1.51633 | 1.83481 |
| θv | 18.7 | 18.5 | 23.3 | 18.4 |
| t | 11.4 (0.33) | 11.4 (0.33) | 14.4 (0.42) | 9.5 (0.32) |
| d | 12.9 (0.37) | 14.1 (0.41) | 33.2 (0.96) | 10.0 (0.34) |
| p | 16.3 (1.0) | 17.8 (1.0) | 16.5 (1.0) | 13.5 (1.0) |
| q | 34.5 | 34.8 | 34.5 | 29.4 |
| ξ | 105.2 | 106.0 | 86.8 | 106.4 |
| Optical path length | 33.3 | 36.5 | 78.9 | 25.9 |
| Conditional Expression (4) | 0.17 | 0.31 | 0.29 | 0.14 |
| t/DB | 0.35 | 0.40 | 0.48 | 0.35 |
| β | 7.8 | 5.0 | 7.9 | 6.9 |

An optical path length is a length between the incident surface "a" and the divisional exit surface "c" along the optical axis "x". A parameter β indicates a maximum incident angle of the focus detection light beam. The parameters "t", "d", "p", and "q" and the optical path length are represented in mm and the parameters $\theta_v$, ξ, and β are represented in degrees.

As is apparent from FIGS. 3 to 6, in the embodiments described above, the thicknesses "d" and "t" of the prisms $P_A$ and $P_B$ in the optical axis "x" direction have a relationship of d>t. This is to minimize an increase in total lens length in the optical axis "x" direction. The thickness of the prism $P_B$ may be made equal to the thickness of the prism $P_A$ (t=d).

For reference, approximately relative values in a conventional structure in which an apex angle of a divisional prism is set to 45° and light beam division is achieved by one-time reflection in the prism are indicated as numerical values inside the parentheses of Table 1. A relative value of the numerical value of "t" is in a range of 0.32 to 0.42. This exhibits that, when the light beam for focus detection is reflected three times in the prism and then emerged, the thickness of the prism $P_B$ that transmits the light beam for image pickup may be made thinner than the thickness of the conventional structure. In Table 1, t/$D_B$ indicates a ratio of the thickness of the prism $P_B$ to the diameter $D_B$ of the image pickup light beam. The ratio in the conventional structure is equal to or larger than 1.0, and hence the numerical value exhibits a prism thickness reduction effect.

Note that, the value of "d" in Embodiment 3 is 0.96 and thus the thickness of the prism $P_A$ is almost not changed as compared with the conventional example. This is because, "n" in Embodiment 3 is smaller than "n" in other embodiments and the lower limit of $\theta_v$ satisfying Expression (2) for the total reflection condition is increased in a case of second reflection on the reflective surface "a" of the prism $P_A$.

Figure 7:
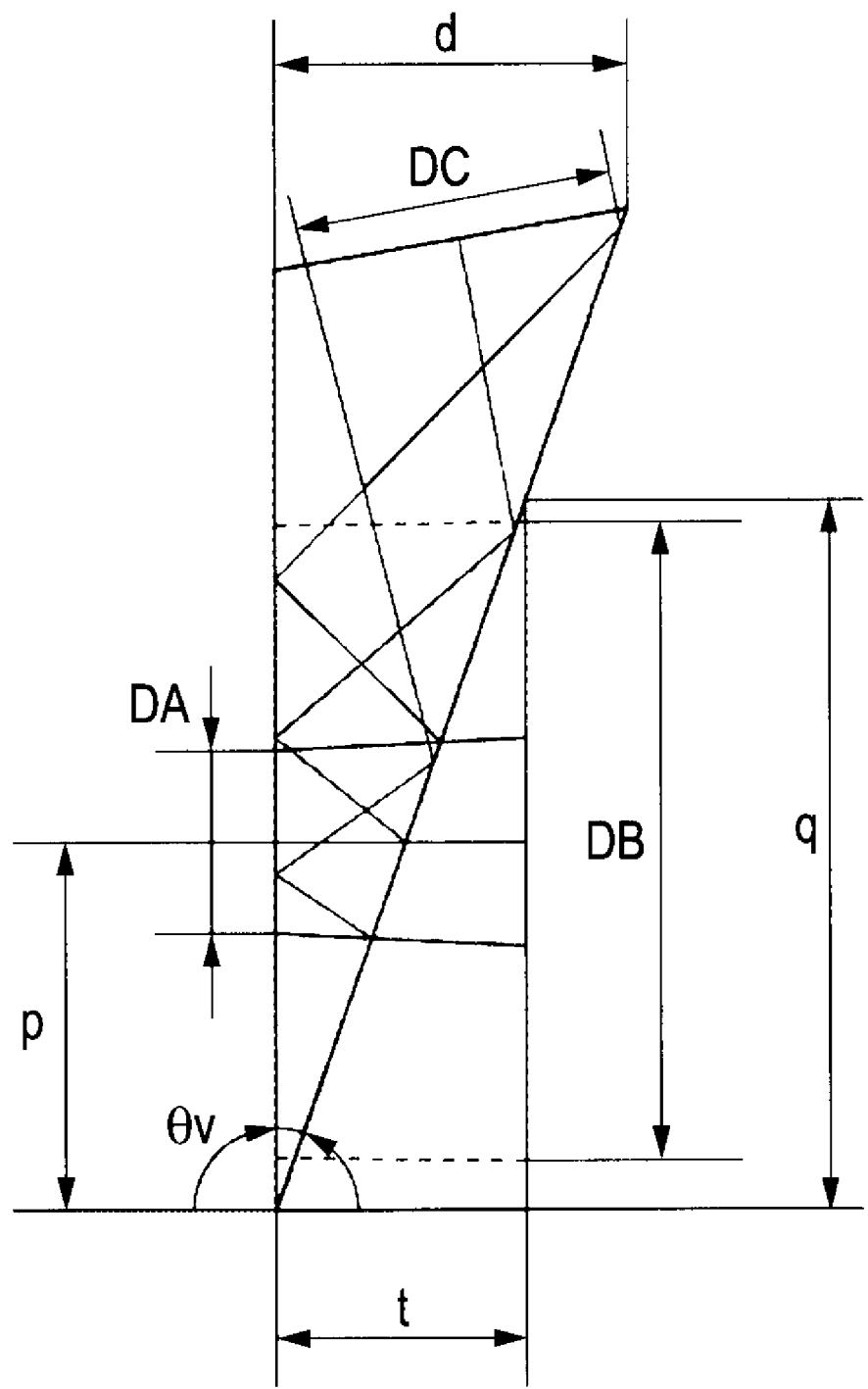
FIG. 7 is a cross sectional diagram illustrating a light beam division optical system according to Embodiment 5 of the present invention.

In contrast to this, in Embodiment 5 (FIG. 7) described below, "n" is set to the same value as in Embodiments 1, 2, and 4 without changing the incident condition of the light beam in Embodiment 3.

TABLE 2

|  | Embodiment 5 |
| --- | --- |
| n | 1.83481 |
| $\theta_v$ | 20.0 |
| t | 12.0 (0.36) |
| d | 16.8 (0.50) |
| p | 16.5 (1.0) |
| q | 33.4 |
| $\xi$ | 100.0 |
| Optical path length | 42.6 |
| Conditional Expression (4) | 0.29 |
| t/DB | 0.40 |
| $\beta$ | 7.9 |

Table 2 illustrates respective parameters of a prism in Embodiment 5. As compared with Embodiment 3, the numerical value of "d" is reduced from 0.96 to 0.50 and thus becomes equal to the numerical values in Embodiments 1, 2, and 4. That is, when the refractive index "n" of the prism is set to a large value, the lower limit of $\theta_v$ may be set to a small value. As a result, the thickness "d" of the prism $P_A$ may be thinned.

Figure 8:
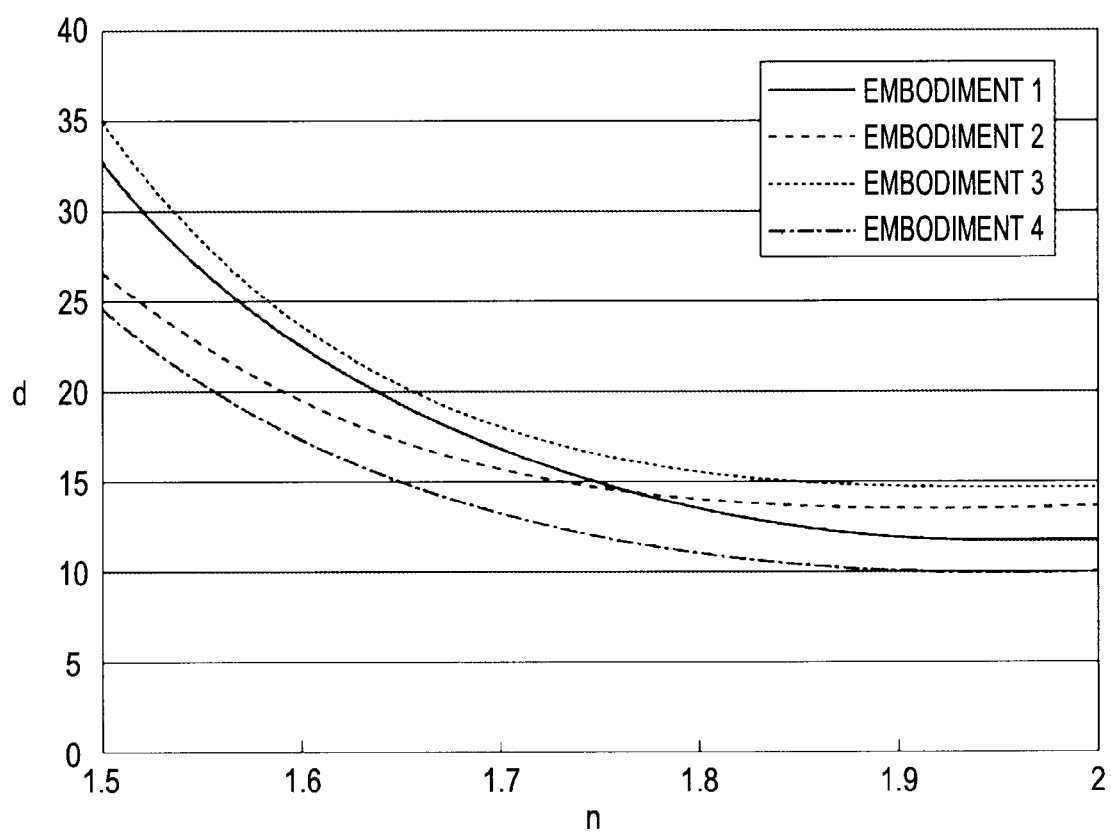
FIG. 8 is a graph illustrating a relationship between a thickness "d" of a prism $P_A$ and a refractive index "n".

FIG. 8 is a graph illustrating the relationship between the thickness "d" and the refractive index "n" in a case where only the refractive index "n" is changed without changing the incident condition of the light beam in each of the embodiments. In the respective embodiments, "d" rapidly reduces in a range of substantially 1.5<n<1.7 but slowly changes in a range equal to or larger than 1.7. Therefore, when the thickness "d" of the prism $P_A$ is to be suppressed to a small value, "n" is desirably set to a value equal to or larger than approximately 1.7.

Figure 9:
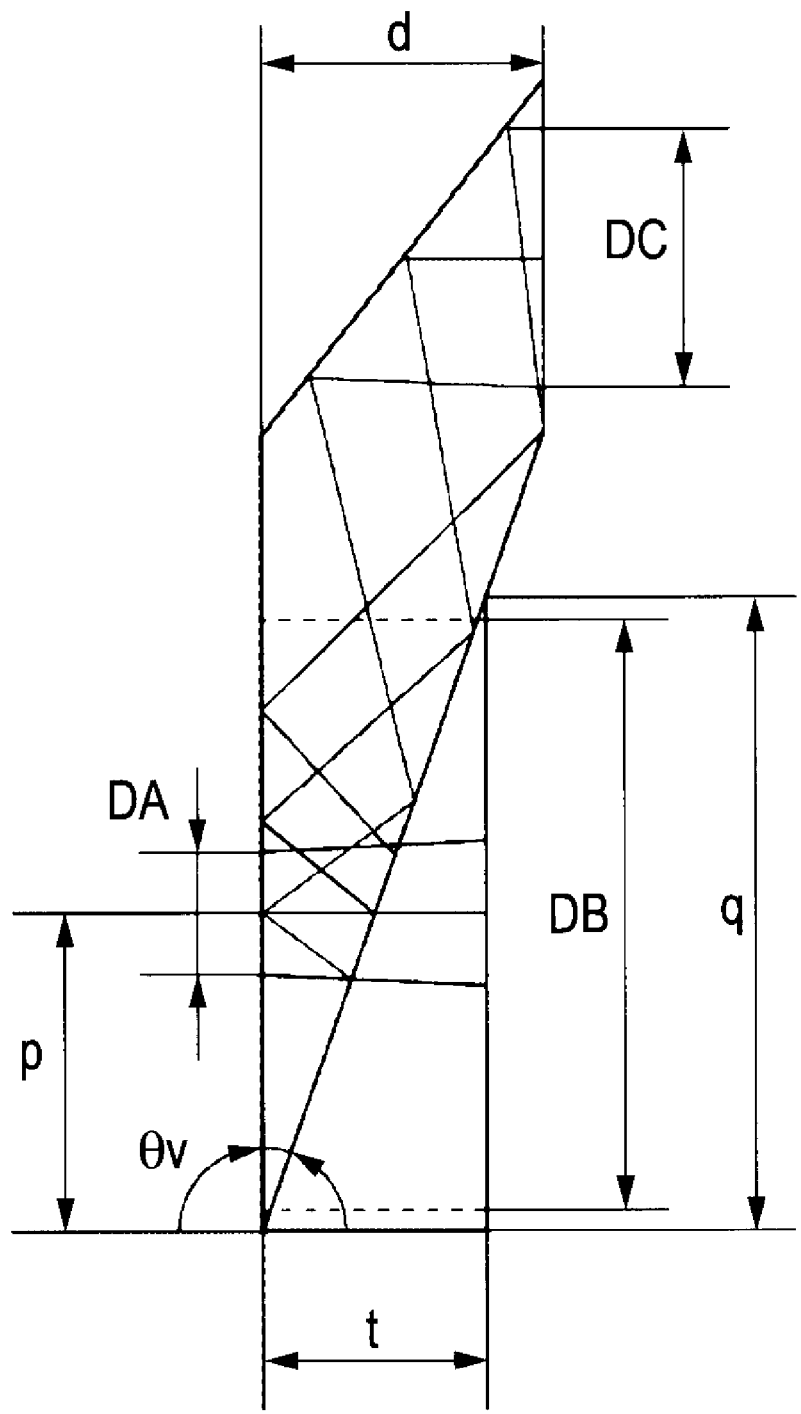
FIG. 9 is a cross sectional diagram illustrating a light beam division optical system according to Embodiment 6 of the present invention.
Figure 10:
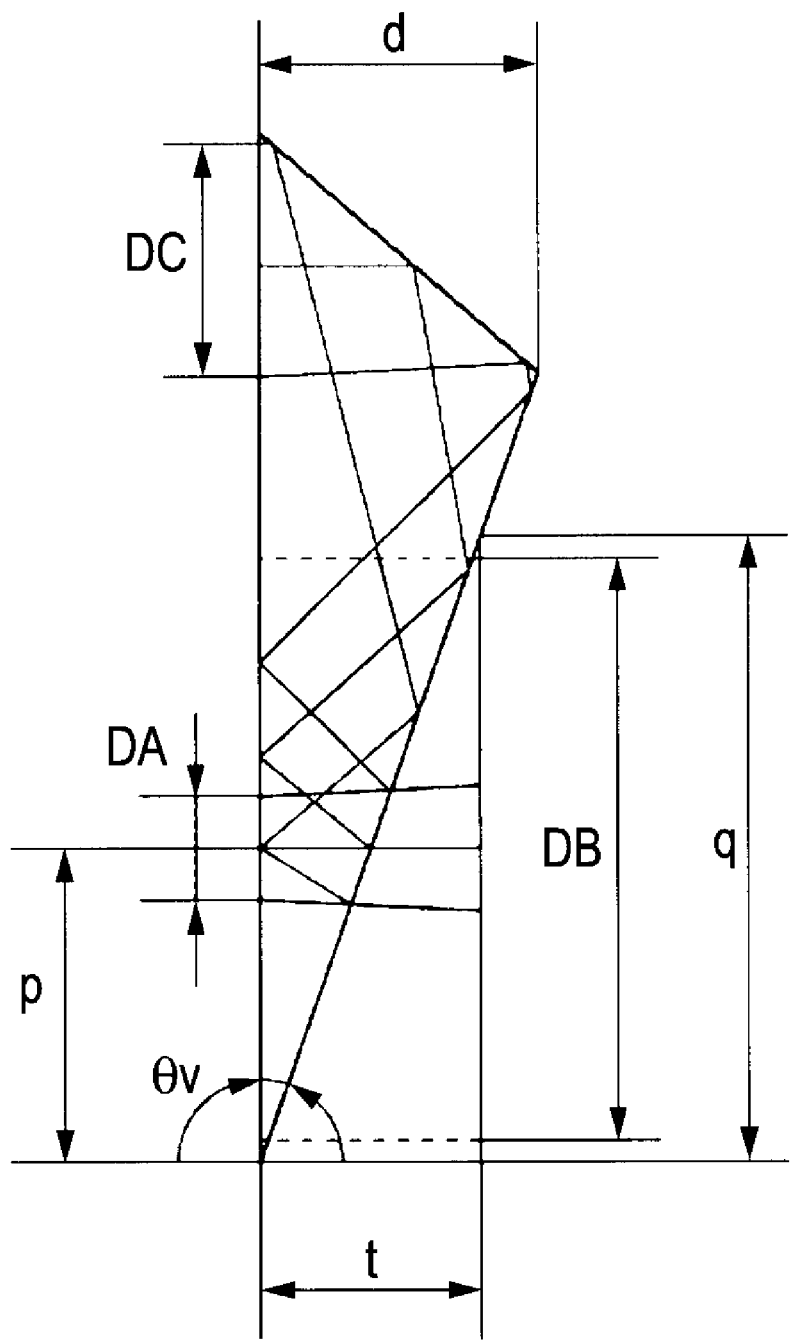
FIG. 10 is a cross sectional diagram illustrating a light beam division optical system according to Embodiment 7 of the present invention.

Next, Embodiment 6 (FIG. 9) and Embodiment 7 (FIG. 10) having a structure in which fourth reflection is caused on a third surface provided to control the exit direction of the light beam for focus detection are described. Table 3 illustrates listed parameters of the respective embodiments.

TABLE 3

|  | Embodiment | |
| --- | --- | --- |
|  | 6 | 7 |
| n | 1.83481 | 1.83481 |
| $\theta_v$ | 20.0 | 20.0 |
| t | 11.8 (0.37) | 11.8 (0.37) |
| d | 15.2 (0.48) | 14.8 (0.46) |
| p | 16.0 (1.0) | 16.0 (1.0) |
| q | 32 | 32 |
| $\xi$ | 0.0 | 180.0 |
| Optical path length | 55.4 | 52.1 |
| Conditional Expression (4) | 0.20 | 0.17 |
| t/DB | 0.39 | 0.39 |
| $\beta$ | 7.0 | 7.0 |

In Embodiment 6, a principal ray of the light beam for focus detection is emitted in an image pickup surface direction ($\xi=0°$). In Embodiment 7, a principal ray of the light beam focus detection is emitted in a subject direction ($\xi=180°$). As is apparent from the above-mentioned examples, when the fourth reflection is caused on the third surface (first reflective surface), the exit angle $\xi$ of the light beam for focus detection may be adjusted in a range of 0° to 180°. When an angle formed between the third surface and the optical axis "x" is suitably set, the exit angle $\xi$ may be made equal to or smaller than 0° or equal to or larger than 180°.

In this case, Expression (4) corresponding to the intensity of the light beam for focus detection is substantially the same as in the other embodiments, and hence the amount of light required for focus detection is ensured. That is, when the structure as described above is employed, the focus position may be detected with high precision. Therefore, a zoom lens suitable to adjust the exit direction of the light beam for detecting the focus position may be obtained.

A comparative example is described in which only a part of an incident light beam (subject light beam) is divided by a half mirror surface which is tilted by 45° with respect to the optical axis of the image pickup optical system and thinned in the optical axis direction of the image pickup optical system. FIG. 12 is a schematic diagram illustrating the example in which only the part of the incident light beam (subject light beam) is divided. In this example, an intensity distribution of the transmission light in an image pickup light beam (light beam reaching image pickup element) becomes uneven (an image in the divisional region is dark), and hence a pickup image is not preferably observed. A light beam incident on an end portion of a joint part is scattered in the end portion of the joint part, and hence it is likely to cause ghost light. In contrast to this, according to the present invention, the unevenness of the intensity of the transmission light may be reduced. In addition, the image pickup light beam passes through the second prism $P_B$, and hence there is no ghost light generated by scattering in the end portion. Therefore, an excellent pickup image may be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-020245, filed Jan. 30, 2009, which is hereby incorporated by reference herein in its entirety.

What is claimed is:
1. An image pickup optical system comprising:
   a first prism including:
      a first incident surface on which a subject light beam from a subject is incident;
      a division surface for dividing the subject light beam, which entered through the first incident surface, into an image pickup light beam traveling toward an image pickup element and a light beam for focus detection traveling toward an image pickup element for focus detection; and
      a first exit surface from which the light beam for focus detection having been reflected on the division surface is emerged; and
   a second prism including:
      a second incident surface on which the image pickup light beam having passed through the division surface is incident; and
      a second exit surface from which the image pickup light beam is emerged,
   wherein the light beam for focus detection is reflected on the division surface for a first time and then reflected on the first incident surface, and reflected on the division surface for a second time to reach the first exit surface, and wherein the image pickup optical system satisfies the following conditional expression $$0.1 < D_A/D_B < 0.5,$$

where $D_A$ indicates an effective light beam diameter of a light beam guided to the image pickup element for focus detection, and $D_B$ indicates an effective light beam diameter of a light beam guided to the image pickup element for image pickup.

2. An image pickup optical system according to claim 1, wherein:
   the first prism further includes a first reflective surface which is different from the first exit surface, and
   wherein after the light beam for focus detection is reflected on the division surface twice, the light beam for focus detection is reflected on the first reflective surface and guided to the first exit surface.

3. An image pickup optical system according to claim 1, wherein the image pickup optical system satisfies $$16.0° \leq \theta_v \leq 28.0°,$$

where $\theta_v$ indicates an apex angle of the first prism.

4. An image pickup optical system according to claim 1, further comprising:
   a focusing lens unit which moves during focusing;
   a magnification-varying lens unit which moves during magnification-varying;
   a stop unit for light quantity adjustment; and
   a focus detection lens unit,
   wherein a light beam guided to the image pickup element for image pickup passes through the focusing lens unit, the magnification-varying lens unit, the stop unit, the first prism, and the second prism in the stated order, and
   the light beam guided to the image pickup element for focus detection passes through the focusing lens unit, the magnification-varying lens unit, the stop unit, the first prism, and the focus detection lens unit in the stated order.

5. An image pickup apparatus comprising:
   an image pickup element for picking up an image of a subject;
   an image pickup element for focus detection; and
   the image pickup optical system according to claim 1.

6. An image pickup optical system comprising:
   a first prism including:
      a first incident surface on which a subject light beam from a subject is incident;
      a division surface for dividing the subject light beam from the first incident surface into an image pickup light beam traveling toward an image pickup element and a light beam for focus detection traveling toward an image pickup element for focus detection; and
      a first exit surface from which the light beam for focus detection having been reflected on the division surface is emerged; and
   a second prism including:
      a second incident surface on which the image pickup light beam having passed through the division surface is incident; and
      a second exit surface from which the image pickup light beam is emerged,
   wherein an image pickup optical system includes an air gap between a division surface and a second incident surface, and
   wherein the light beam for focus detection is reflected on the division surface for a first time and then reflected on the first incident surface by Total internal reflection, and reflected on the division surface for a second time to reach the first exit surface by Total internal reflection,
   wherein the image pickup optical system satisfies the following conditional expression $$0.1 < D_A/D_B < 0.5,$$

where $D_A$ indicates an effective light beam diameter of a light beam guided to the image pickup element for focus detection, and $D_B$ indicates an effective light beam diameter of a light beam guided to the image pickup element for image pickup.

7. An image pickup optical system according to claim 6, wherein:
   the first prism further comprises a first reflective surface which is different from the first exit surface; and
   after the light beam for focus detection is reflected on the division surface twice, the light beam for focus detection is reflected on the first reflective surface and is guided to the first exit surface.

* * * * *